P. J. Stone,
Scythe.

No. 105,996. Patented. Aug. 2. 1870.

Witnesses.

Peter J. Stone
by his Atty

UNITED STATES PATENT OFFICE.

PETER JEROME STONE, OF ATHENS, PENNSYLVANIA.

APPARATUS FOR CUTTING GRASS UNDER WATER.

Specification forming part of Letters Patent No. 105,996, dated August 2, 1870.

*To all whom it may concern:*

Be it known that I, PETER JEROME STONE, of Athens, county of Bradford, State of Pennsylvania, have invented a new and Improved Apparatus for Cutting Grass from the Bottom of Canals, of which the following is a full, clear, and exact description, reference being had to the accompanying drawing, making a part of this specification, in which—

Figure 1:
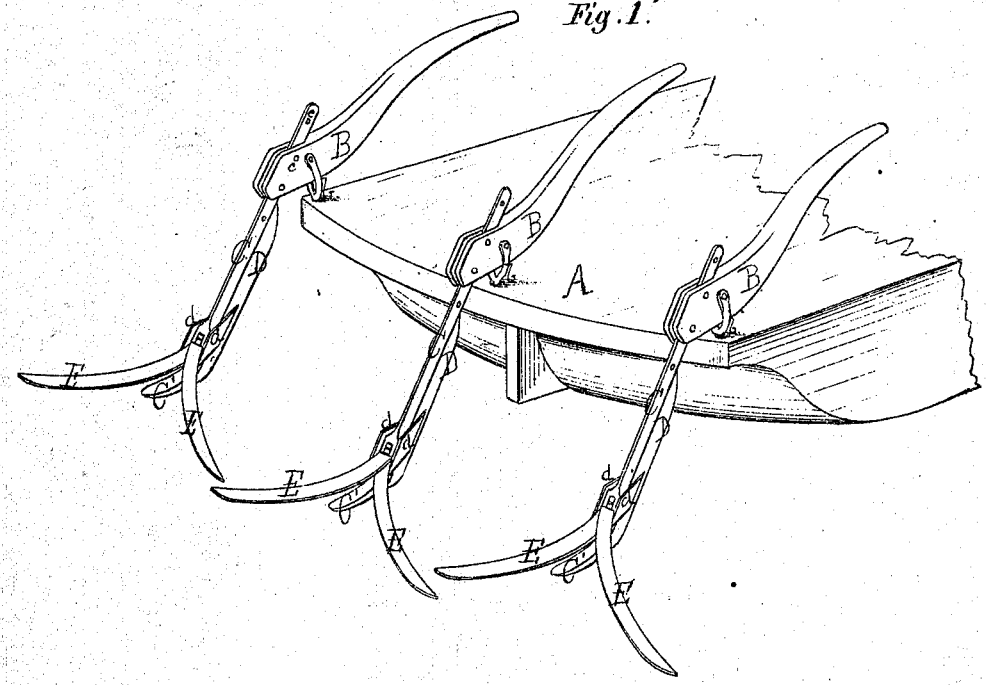
Figure 2:
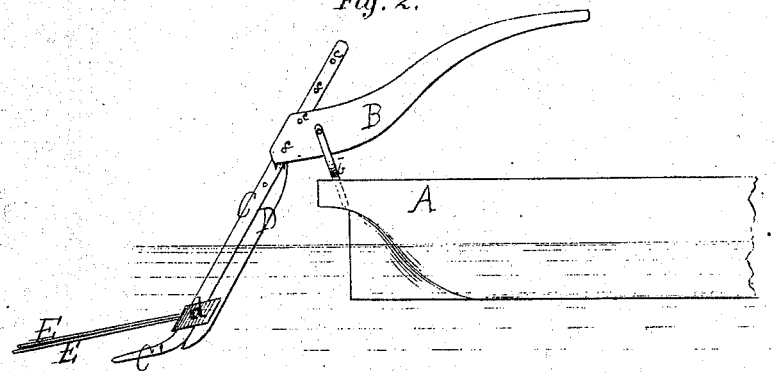

Figure 1 is a perspective view of my improved apparatus, and Fig. 2 is a side view of one of the cutters.

A serious hinderance to the navigation of canals and all shallow bodies of water is the great quantity of vegetable growth which is nearly always found in them.

With a view to furnish means whereby this "grass," as it is generally called, may easily and rapidly be cut close to the bottom of the canal, I have invented an apparatus the nature and operation of which will be fully understood from the following description.

In the drawing, A represents the stern portion of a boat, which may be an ordinary canal-boat, although it will ordinarily be preferable, on account of lightness of draft, to build one on purpose for this use.

B is tiller-lever, made in form substantially like those employed in connection with the ordinary rudder of a boat, as shown in the drawing. This tiller-lever is mounted in a forked pivot, *b*, or its equivalent, so as to be capable of having both a rising and falling motion and a horizontal swinging one.

C is a standard, secured in the outer end of tiller-lever B, in a position nearly at right angles to the same, and which may be adjusted vertically by means of perforations *c*, or in any other well-known or desired manner.

C' is a shoe or runner, at the lower end of standard C, and may be either made in one piece with the standard, or made separately and attached, as convenience shall require.

D is a cutting-blade or knife, made of suitable material, and attached in a vertical position to the front or inner side of standard C.

E E are two other cutting-blades, secured to the lower end of standard C, and extending to the rear of the same, as shown.

Blades E E are placed in a plane nearly at right angles to standard C, and at about a right angle with each other. I prefer to make them slightly curved in form, as a common scythe is.

*d* are wings or guards, attached to blade D and extending rearward, so as to overlap blades E E at the point where they are secured to standard C.

The operation of my apparatus is as follows: I mount as many of them upon the stern of a boat as will be necessary in order to have the outer ends of the cutting-blades overlap the adjacent ones, as shown in Fig. 1, and let the cutting-blades down into the water until the shoe C' rests upon the bottom, adjusting the standard C in tiller-lever B in such manner that when the shoe is on the bottom blades E E shall be parallel, or nearly so, with the bottom.

The boat is now propelled by such power as is preferred, and as the apparatus is drawn through the water, the cutting-blades mow the grass at such height as may be desired.

The blade D serves to cut apart such grass as may be interwoven or tangled, and would otherwise wrap and clog about standard C, thus adding largely to the draft, besides having a tendency to lift cutting-blades E E up from the bottom.

The attendant can, by means of tiller-lever B, guide and direct the course of the cutters, or lift them out of the water when necessary, and, under ordinary circumstances, they will probably require to be held down to their work.

The angles at which I have described the various parts as being placed may be varied as circumstances may demand, and the wings *d*, which serve to keep the grass from clogging at the junction of blades E and standard D, may not be essential.

Having now described my invention, what I claim as new, and desire to secure by Letters Patent, is—

1. The combination of tiller-lever B, adjustable standard C, and cutting-blades E, substantially as set forth.

2. The cutting-blade D, in combination with blades E E, standard C, and tiller-lever B, substantially as set forth.

3. The wing or guard *d*, in combination with blades D E E and standard C, substantially as set forth.

4. The shoe C', in combination with standard C and blades E E D.

In testimony whereof I have hereunto set my hand this 10th day of June, 1870.

PETER J. STONE.

Witnesses:
EDWARD HERRICK, Jr.,
W. A. MITCHELL.